United States Patent Office 3,487,891
Patented Jan. 6, 1970

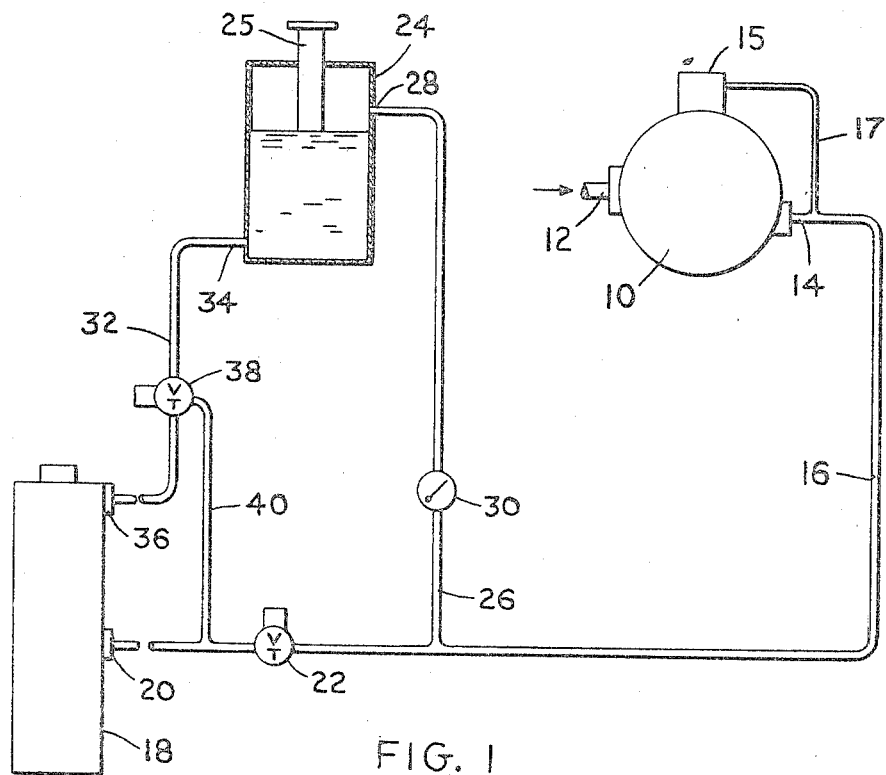
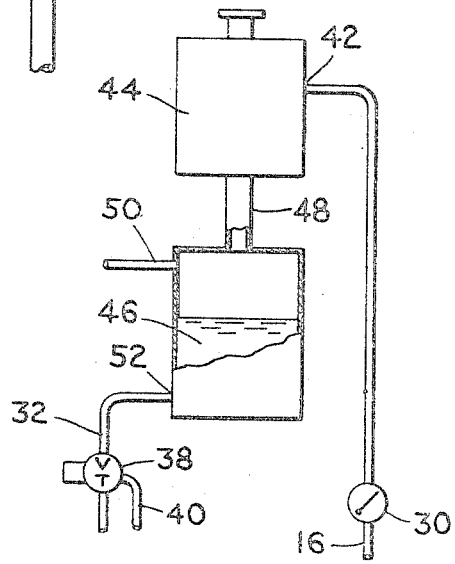
FIG. 1
FIG. 2
LINWOOD A. PICKLE
INVENTOR.

3,487,891
PRESSURE LUBRICATION SYSTEM FOR PNEUMATIC MACHINERY
Linwood A. Pickle, South Hadley, Mass., assignor to Worthington Corporation, Harrison, N.J., a corporation of Delaware
Filed Nov. 29, 1967, Ser. No. 686,555
Int. Cl. F01m *1/00;* F16n *5/00, 17/06*
U.S. Cl. 184—6                        5 Claims

ABSTRACT OF THE DISCLOSURE

A lubrication system for pneumatically operated devices which utilizes the pressure peaks associated with the unloading of pneumatic compressors to produce a pressure in the lubrication system higher than the normal working pressure of the compressor.

Field of the invention

This invention deals with a lubrication system for a pneumatically operated device with the system having a force feed air operated lubricator wherein the lubricant in the lubricator is subjected directly to pressure of compressed fluid which pressure forces the lubricant from the receptacle.

Description of the prior art

Previous methods for lubricating pneumatically operated devices have used gravity feeds, venturi devices, auxiliary pumps, or pressure drops in the connecting lines downstream of the oil tank pressure supply connection to supply lubricating oil to the pneumatically operated devices.

All of these systems have inherent disadvantages. Systems employing auxiliary lubricating pumps are of necessity, more complex and therefore less reliable due to the introduction of additional machinery for the sole purpose of lubrication.

The gravity lubrication systems while suitable for very low pressure applications are unsuitable for a great many pneumatically operated devices because the high pneumatic pressure necessary for driving the devices are greater than the head produced by the gravity flow of the lubricant.

Lastly in lubricating systems wherein the same compressor which drives the pneumatic device is used to pressurize the lubricant, the maximum pressure of the lubrication system is usually equal to the pressure of the power fluid used to operate the pneumatic device.

Summary of the invention

The present invention provides a lubrication apparatus for pneumatic devices driven by a standard compressor wherein the lubricant is pressurized by the same compressor but at a pressure greater than the normal operating pressure of the power fluid supplied by the compressor to operate the pneumatic device.

The higher lubricant pressure is obtained by an apparatus which traps the discharge of the compressor during the unloading cycle thereof. The trapped fluid is at a pressure higher than the operating or rated discharge pressure of the compressor because of the pressure peaks inherent in the unloading of the compressor.

Additionally, since there is no significant fluid flow during the compressor unloading cycle, the pressure of the trapped fluid has not been reduced by the pressure drops inherent in dynamic pneumatic systems, such as line friction losses and drops across control valves.

Accordingly, it is an object of the present invention to provide a pressurized lubricating system for a pneumatic system which includes a compressor for driving pneumatic devices, wherein the pressurized lubricant is at a higher pressure than the normal pressure of the fluid powering the pneumatic devices.

Still another object of the present invention is to provide a pressurized lubrication system for pneumatically driven devices wherein the same compressor which drives the pneumatic devices pressurizes the lubrication system at a higher pressure than the rated discharge pressure of the compressor.

Yet another object of the present invention is to provide an improved pressurized lubrication system for pneumatically operated devices which does not utilize a separate pump or auxiliary pressurization system for pressurizing the lubricant delivered to the pneumatically operated devices.

A further object of the present invention is to provide a pressurized lubrication system for pneumatically driven devices which utilizes periodic pressure fluctuations in the discharge of a compressor to pressurize the lubricant to a higher pressure than the working pressure of the power fluid for operating the pneumatic devices.

Yet a further object of the present invention is to provide a pressurized lubrication system for pneumatically operated equipment having a minimum of moving parts.

Another object of the present invention is to provide a pressurized lubrication system which utilizes the pressure drops inherent in a dynamic pneumatic system to provide a differential in pressure for the lubrication system above the working pressure of the dynamic pneumatic system.

Still a further object of the present invention is to provide a pressurized lubrication system of simplified construction.

Yet a further object of the present invention is to provide a pressurized lubrication system having great reliability and long service life.

Various other objects will be apparent from the following description of several embodiments of the invention, and novel features will be particularly pointed out hereinafter in connection with the appended claims.

Brief description of the drawings

FIGURE 1 is a schematic representation of a pneumatic system for driving a pneumatic tool which system includes a pressurized lubrication system in accordance with the teachings of this invention.

FIGURE 2 is a schematic representation of a portion of another embodiment of a lubrication system in accordance with the teachings of this invention.

Description of the preferred embodiments

In the embodiment of the invention illustrated in FIG-URE 1 a compressor 10 having an inlet 12 and an outlet 14 discharges into a discharge line 16 which is connected to a piece of pneumatic machinery 18, in this case a rock drill, at inlet port 20 thereof. The rock drill can be a common commercially available item such as a Worthington WD-47 Rock Drill, manufactured by the Worthington Corporation of Harrison, N.J. A control valve 22 in line 16 throttles the air supply to the rock drill to control the operation of the drill.

The compressor has an unloader 15 which unloads the compressor in response to a predetermined pressure build-up in the discharge 14 of the compressor. These pressure build-ups are sensed by a sensing conduit 17 running from the compressor discharge 14 to the unloader 15.

Upstream of control valve 22 is an air-oil receptor 24 connected to compressor discharge line 16 by branch line 26 connecting between the compressor discharge line and inlet 28 of the air-oil receptor. The air-oil receptor is a common, commercially available item such as a Worthington Air-Oil Receptor Model No. TNK-504, manufactured by the Worthington Corporation of Harrison, N.J. A filling tube 25, with a suitable pressure retaining cap thereon (not shown) is connected to the receptor, through which it can be filled with lubricant. A check valve 30 is disposed in line 26 to allow one-directional flow of air from discharge line 16 to air-oil receptor 24 when the pressure in the discharge line 16 is greater than that in receptor 24.

A delivery line 32 connects the outlet 34 of air-oil receptor 24 with the lubricant inlet 36 of the rock drill. A control valve 38 is disposed in line 32 to control the flow of lubricant from the air-oil receptor to the pneumatic device being lubricated. The control valve can be a common, commercially available, pilot type valve, such as a Humphrey Pilot Operated Air Valve, Series A, manufactured by the Humphrey Products Division of General Gas Light Co., Kalamazoo, Mich.

Valve 38 is a normally closed valve which is actuated by a positive pressure signal sensed through a sensing line 40 which communicates the pressure receptor of the valve with line 16 at a point downstream of control valve 22.

In operation, the system functions as follows. With control valve 22 closed, the compressor 10 is started and builds up output pressure. The compressor charges any accumulating tanks in the system (not shown in the drawings for purposes of clarity) and pressurizes the entire pneumatic system up to control valve 22, until the maximum pressure of the compressor is reached. When this maximum pressure is reached, the unloading mechanism 15 associated with the compressor senses the pressure build-up in line 17 and thereupon unloads the compressor.

When the operator wishes to utilize the rock drill, control valve 22 is opened and compressed air flows from the discharge of the compressor to the inlet of the rock drill. The pressure in compressor discharge 14 drops, and the compressor resumes discharging air at its normal discharge rating.

The normal output pressure of the compressor is significantly below the unloading pressure of the compressor. Therefore, during operation of the rock drill the pressure sensed in line 26 upstream of check valve 30 will be significantly lower than the pressure downstream of check valve 30 which, as previously mentioned, will be equal to the unloaded pressure of the compressor.

This pressure differential is actually greater than the difference between the loaded and unloaded discharge pressure of the compressor. The discharge from the compressor loses pressure as it flows through the pneumatic system because of the pressure drops inherent in the flow of a gas and thereby further reduces the pressure upstream of check valve 30. For example, pressure drops will occur as the discharge of the compressor flows through the compressor demester (not shown for purposes of clarity) and because of the bends and frictional losses in discharge line 16.

Accordingly, it is seen that the action of check valve 30 in line 26 is to insure that the air pressure within the air-oil receptor reaches the maximum or unloading pressure of the compressor and that this pressure is then prevented from being dissipated into the discharge line when the compressor discharge pressure drops.

The stored pressure in the air-oil receptor is used to force the lubricant in the bottom of the receptor 24 through line 32 to the rock drill 18. The flow of lubricant is controlled by control valve 38 which in turn is actuated by control valve 22. When control valve 22 is opened, the pressure in line 16 downstream thereof will increase. This pressure will be communicated to valve 38 through sensing conduit 40 and actuate the valve to allow lubricant to flow to the rock drill.

The pressure in air-oil receptor 24 will gradually drop as the lubricant is expelled therefrom. It is therefore necessary to select an air-oil receptor with a large enough air storage capacity so that the pressure will not fall below a predetermined level during each operating period of the rock drill.

Of course, the pressure in the air-oil receptor can never fall significantly below the operating discharge pressure of the compressor, since as soon as the pressure in receptor 24 drops a predetermined amount below the pressure in line 16, check valve 30 will open and equalize the pressures therebetween.

The pressure in air-oil receptor 24 is brought back to the unloading pressure of the compressor by closing control valve 22 which unloads the system as previously described.

Additionally, the closing of valve 22 will close valve 38 and thereby prevent flow of lubricant and corresponding loss of lubricant pressure during periods when the rock drill is not in operation.

In applications where the pneumatically operated device does not require large quantities of lubricant, it may be practical to substitute a simple needle type of control valve for the pressure actuated control valve described herein.

In FIGURE 2, a different air-oil receptor is shown. For purposes of simplicity, the same items which appear in both figures will be designated by the same numbers.

In FIGURE 2, discharge line 16 with check valve 30 disposed therein, is connected to the inlet 42 of separate air storage chamber 44. The compressed air in the air storage chamber 44 pressurizes the lubricant stored in lubricant storage chamber 46 by passing through conduit 48 which connects the two storage chambers.

A filling line 50, with suitable valving (not shown), is connected to lubricant storage chamber 46 through which the chamber is filled with lubricant.

Lubricant leaves chamber 46 through outlet 52 and passes to the rock drill through line 32 as described above.

It should be noted that although the embodiments of the invention described herein showed only one pneumatically operated device driven by the compressor, it is within the purview of the invention to include several pneumatic devices operating simultaneously or independently of each other, and with a central lubrication system or individual lubrication systems for each pneumatically operated device.

Additionally, the invention need not be restricted to lubricating liquids, but can be used to inject any liquid into a pneumatic system. For example, the invention could be used to inject water into an air stream to keep dust down while rock is being drilled.

Further, it should be mentioned that the invention is not limited to air systems, but can be applied to any pneumatic system.

It will be understood that various changes in the details materials and arrangements of the parts which have been herein described and illustrated in order to explain the nature of this invention, may be made by those skilled in the art within the principle and scope of the invention.

What is claimed is:

1. In a pneumatic system including a compressor having unloading means therein to unload said compressor in response to a build-up in the discharge pressure thereof, said compressor supplying power fluid to a pneumatically operated device through a supply conduit means connected to the discharge of said compressor, and means operatively associated with said supply conduit means to control the flow of power fluid to said pneumatically operated device and thereby to effect the unloading of said compressor during periods of non-operation of said pneumatic device, wherein the improvement comprises a pneumatically pressurized lubrication system comprising:

(a) lubrication storage means;
(b) compressed fluid storage means in fluid flow communication with said lubricant storage means to pressurize the lubricant therein;

(c) first conduit means communicating said compressed air storage member with said compressor discharge at a point upstream of said power fluid control means to provide compressed fluid to said air storage means;

(d) second conduit means connecting said lubricant storage means with said lubricant system of said pneumatically operated device;

(e) lubricant control means in said second conduit means to control the flow of lubricant from said lubricant storage means to said pneumatically operated device;

(f) check valve means in said first conduit means to allow flow from said first conduit means to said compressed fluid storage means when the pressure in said first conduit means upstream of said check valve means is higher than the pressure in said fluid storage means, whereby compressed fluid at the maximum discharge pressure of said compressor is held in said fluid storage means to pressurize the lubricant in said lubrication storage means.

2. The combination claimed in claim 1, wherein said lubricant storage means and said compressor storage means form a single air-oil receptor.

3. The combination claimed in claim 1, wherein said power fluid control means is connected to said pneumatically operated device.

4. The combination claimed in claim 1, wherein said first conduit means is connected to the discharge of said compressor.

5. The combination claimed in claim 1, wherein said lubricant control means comprise:

(a) valve means normally closed and actuated in response to a positive pressure signal; and (b) conduit means connecting said valve means with said supply conduit means downstream of said power fluid control means to provide a positive pressure signal to said valve means, whereby lubricant will be provided to the pneumatically operated device only during the operating periods thereof.

References Cited

UNITED STATES PATENTS

| 1,803,746 | 5/1931 | Christman | 184—39 XR |
| 3,280,835 | 10/1966 | Hill et al. | 184—6 XR |
| 2,854,296 | 9/1958 | Eberle et al. | |

FOREIGN PATENTS

| 661,138 | 3/1965 | Belgium. |
| 733,359 | 5/1966 | Canada. |
| 1,107,463 | 5/1961 | Germany. |

FRED C. MATTERN, JR., Primary Examiner

MANUEL A. ANTONAKAS, Assistant Examiner

U.S. Cl. X.R.

184—39